United States Patent [19]

Sandlofer

[11] Patent Number: 4,791,885
[45] Date of Patent: Dec. 20, 1988

[54] WHALE HARNESS

[76] Inventor: Michael I. Sandlofer, 610 City Island Ave., City Island, N.Y. 10464

[21] Appl. No.: 750,009

[22] Filed: Jun. 27, 1985

[51] Int. Cl.⁴ ............................................. A62B 35/00
[52] U.S. Cl. .................................................... 119/96
[58] Field of Search .................... 119/96, 106, 110, 29, 119/111, 109; 43/7; 128/134; 297/275

[56] References Cited

U.S. PATENT DOCUMENTS

| | | | |
|---|---|---|---|
| 613,334 | 11/1898 | Thompson | 128/134 |
| 2,921,397 | 1/1960 | Luthi | 43/7 |
| 3,046,982 | 7/1962 | Davis | 128/134 |
| 3,074,378 | 1/1963 | Clayton | 119/110 |
| 3,310,034 | 3/1967 | Dishart | 119/96 |
| 3,467,085 | 9/1969 | Cormier | 128/134 |
| 3,701,395 | 10/1972 | Theobald | 128/134 |
| 3,753,422 | 8/1973 | Seiple | 119/29 |
| 3,761,082 | 9/1973 | Barthel, Jr. | 182/3 |
| 3,948,222 | 4/1976 | Longshore et al. | 119/96 |
| 4,299,211 | 11/1981 | Doynow | 128/134 |
| 4,506,664 | 3/1985 | Brault | 128/134 |
| 4,676,198 | 6/1987 | Murray | 119/109 |

FOREIGN PATENT DOCUMENTS 283753  9/1913  Fed. Rep. of Germany ....... 54/6 A

Primary Examiner—Robert P. Swiatek
Assistant Examiner—Adriene J. Lepiane
Attorney, Agent, or Firm—Flehr, Hohbach, Test, Albritton & Herbert

[57] ABSTRACT

A harness for towing a sea mammal includes a first strap which extends around the body of the mammal at a point between the head and tail of the mammal. A second strap is secured to the first strap and extends along the port side of the mammal to a point forward of the mammal's head. A third strap is secured to the first strap and extends along the starboard side of the mammal to a point forward of the mammal's head. A fourth strap is secured to the second and third straps and extends between the straps and below the head of the mammal, whereby towing the mammal with the mammal's head in an elevated position may be accomplished by pulling the second and third straps.

1 Claim, 2 Drawing Sheets

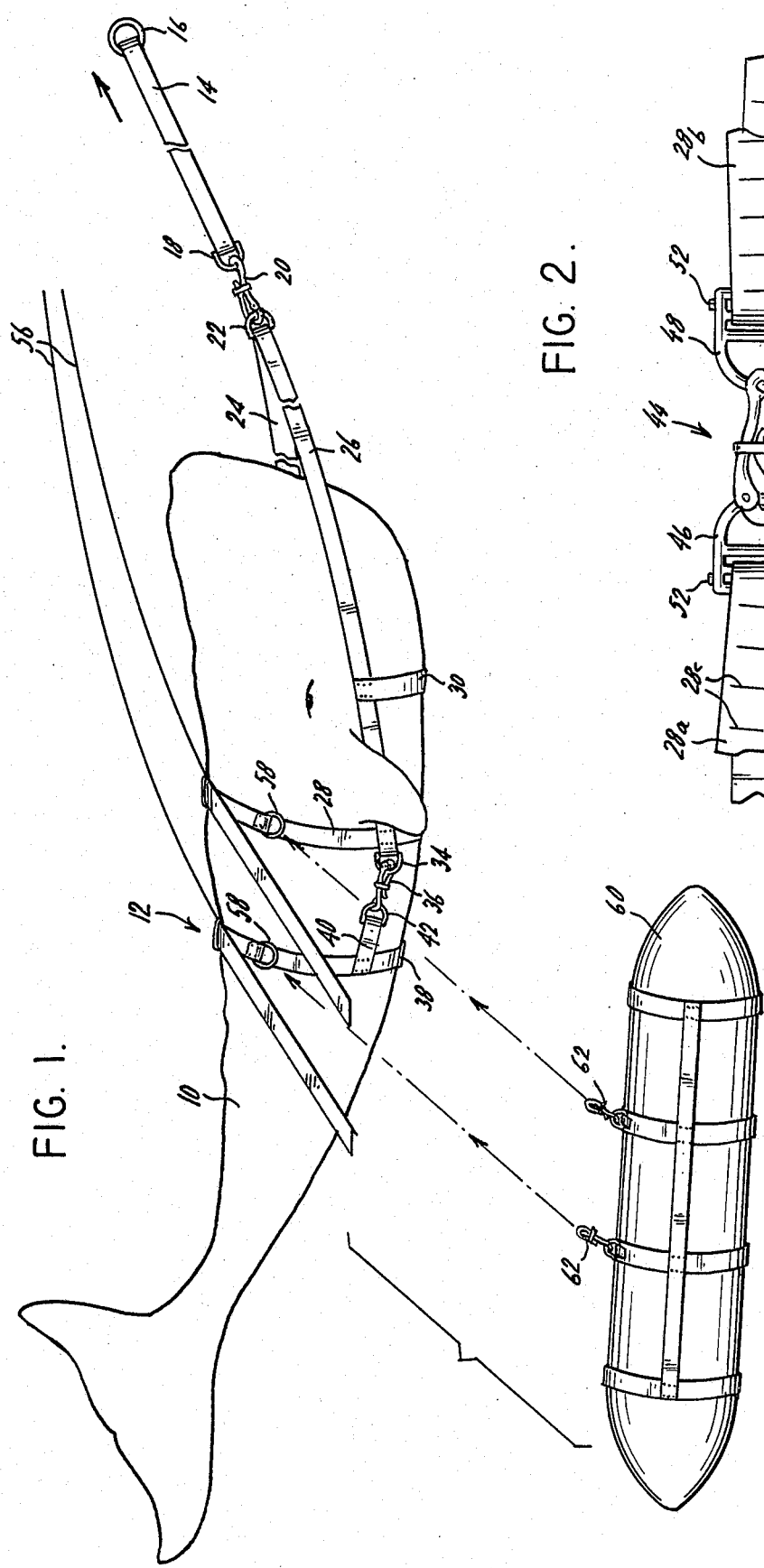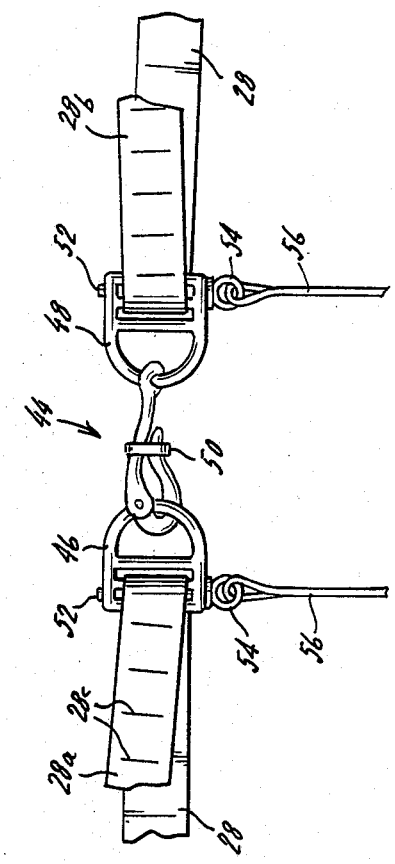

WHALE HARNESS

The invention relates to a harness used for achieving the safe, humane and successful rescue of a beached whale, and other stranded marine mammals.

The whale is a majestic creature known to have a high degree of intelligence and sensitivity. His biological similarity to man makes him an important barometer for scientists to determine the extent of pollution in the seas and its effect on the human population. The whale has much to teach us too, with its sophisticated sonar echo system which enables it to chart its course of travel. Thus, a healthy whale population can benefit humankind in its efforts to maintain and prolong life.

There are two areas in which the great whale population has been threatened. The first is in the commercial slaughter of whales. The International Whaling Commission has voted by a margin of 25 to 7 to ban all commercial whaling by 1986. This vote represents a major advancement in man's acknowledgement and commitment to the whale's right to survive. The ban has been characterized as a great victory in the long fight to save these magnificent creatures, a triumph for human decency and compassion. Unfortunately, that opinion is not shared by all the nations of the world and the commercially-hunted whale is still in great danger of becoming extinct.

The whale's inexplicable predilection for beaching itself is the second great threat to its survival. Beaching is the term used when a whale comes in to shore and becomes stranded on the beach with no independent ability to return to the deeper waters where he can swim and maneuver. Whales are known to beach when they are old and too feeble to swim against the inshore currents, when their sonar echo systems are faulty in unfamiliar waters, when they are in pain or sick, or when they attempt to rescue a beached member of their herd who is sending out distress signals.

Except in the cases of the sick or old whale who can no longer function, most beached whales are otherwise healthy mammals. Hundreds of whales are known to beach themselves each year. In New Zealand alone, in the period of 1873 to 1975, there were 35 mass strandings reported that involved 2129 whales.

The fact that twice as many sperm whale strandings were reported in the five year period of 1970-1975 than in the previous 96 years suggests that earlier sightings were inaccurately reported. The apparent increase in beachings in the last 20 years may be due to more accurate reporting or to the effects of greater pollution in our waters.

Conventional methods for attempting to tow stranded whales back to sea or to a sick bay area involve attaching a rope to the tail portion of the whale and then towing the whale backwards. This backwards tail tow often results in the death of the whale as it immobilizes the whale's tail and therefor the whale, resulting in drowning. Even when the backward tail technique is not fatal, it is not desired as it is extremely stressful for the whale and is both painful and injurious to the whale's skin.

Accordingly, it is an object of the present invention to provide a harness capable of the safe, humane and successful rescue of a beached whale or other stranded marine mammal.

Another object of the present invention is to provide a whale harness which will not chafe the mammal and which will be neither painful nor injurious to the mammal's skin.

Still another object of the present invention is to provide a whale harness in which the whale is towed in a forward position with its head elevated, thereby eliminating the severe disadvantages inherent in the conventional backward tail tow technique.

A further object of the present invention is to provide a whale harness which permits quick and easy application and release.

A still further object of the present invention is to provide a whale harness which can be put on a whale which is stranded in either shallow water or on a beach.

An additional object of the present invention is to provide a whale harness which includes optional flotation apparatus to compensate for the whale's inherent negative buoyancy.

These and other objects are provided in accordance with the present invention, in which a harness for towing a sea mammal is formed from a first strap which extends around the body of the mammal at a point between the head and tail of the mammal. A second strap is secured to the first strap and extends along the port side of the mammal to a point forward of the mammal's head. A third strap is secured to the first strap and extends along the starboard side of the mammal to a point forward of the mammal's head. A fourth strap is secured to the second and third straps and extends between the straps and below the head of the mammal, whereby towing the mammal with the mammal's head in an elevated position may be accomplished by pulling the second and third straps.

The above brief description as well as further objectives, features and advantages of the present invention will be more fully understood by reference to the following detailed description of the presently preferred, but nonetheless illustrative embodiment in accordance with the present invention, when taken in conjunction with the accompanying drawings, wherein:

FIG. 1 is a perspective view of a whale wearing the whale harness of the present invention;

FIG. 2 is a front elevational view of one form of connecting device useable with the whale harness shown in FIG. 1;

Figure 3:
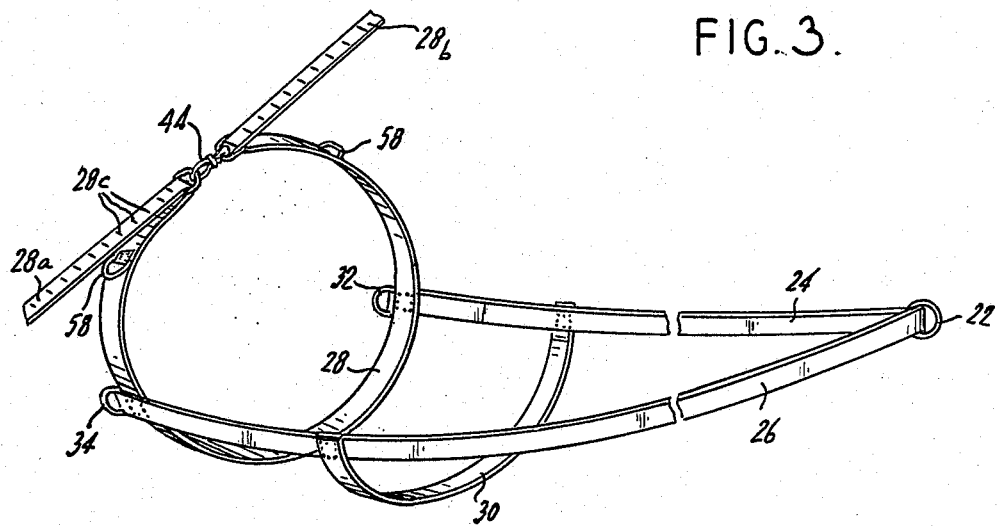
FIG. 3 is a perspective view of the whale harness of the present invention.

Referring now to FIGS. 1-3 a whale 10 wearing the whale harness of the present invention is shown in FIG. 1. The harness is indicated generally by the reference numeral 12, and is formed with a forward tow strap 14 adapted to be connected at its forward end to a boat or other means capable of towing the whale 10. The strap 14 is formed with a ring 16 to facilitate attachment to the towing means and the strap 14 (as well as the other straps of the harness) is formed of material having sufficient strength to permit the whale to be safely and effectively towed, such as, four inch wide nylon webbing.

The opposite end of strap 14 is formed with a D-ring 18 from which extends a fast release pelican hook type connector 20, although it will be readily appreciated that any quick release type connector could be utilized.

Connector 20 is used to secure the tow strap 14 to a D-ring 22 from which extends a port strap 24 and a starboard strap 26. The straps 24 and 26 extends along the respective left and right sides of the whale, underneath and past the whale's flippers, with the respective ends of the straps remote from the D-ring 22 secured to opposite sides of a first body strap 28. In addition, a chin strap 30 is connected at opposite ends to the port strap 24 and the starboard strap 26 and extends between the two straps 24 and 26 and beneath the head of the whale 10 at a location forward of the whale's flippers.

The chin strap 3 serves to keep the whale's head up during towing, thereby preventing against extreme stress and accidental drowning of the whale. It is also contemplated to use multiple chin straps, not shown, positioned forwardly of the strap 30 to provide extra support for the whale's head. The use of multiple chin straps and their ultimate configuration on the harness is dependent upon the type of whale or mammal to be rescued. For example, in fashioning a harness for use in an area where finback or humpback whales predominate, the use of three spaced chin straps (each extending between the port strap 24 and starboard strap 26) is desired.

Connecting the chin strap 30 to the port and starboard straps 24 and 26, as well as all other strap to strap connections, may be accomplished by riveting, stitching or gluing with a water proof adhesive. In addition, a suitable lubricant may be applied to the straps to aid in placement of the harness 12 on the whale 10, which procedure is described in detail below.

Each of the straps 24 and 26 extends slightly past the first body strap 28 (toward the whale's tail) and terminates in respective D-rings 32 and 34. As shown in FIG. 1 with respect to the starboard strap 26, D-ring 34 is used with a fast release pelican hook type connector 36 which serves to connect the starboard strap 26 and first body strap 28 to a second body strap 38. Specifically, a strap 40 extending from the second body strap 38 carries a D-ring 42 to which the other end of the connector 36 is attached.

Each of the first and second body straps 28 and 38 are adapted to fit around the whale, with the two ends of each strap connected to each other by a connector which permits adjustment of the length of each strap (so as to permit a tight fit on the whale) and which permits the disconnection of the two ends of each strap from a remote location. One type of connector which may be used is shown in detail in FIG. 2 and indicated generally by the reference numeral 44. Connector 44, shown for use with first body strap 28, includes a pair of rings 46 and 48, connected to each other by a pelican hook connector 50. The rings 46 and 48 receive respective ends 28a and 28b of the strap 28. Each end 28a and 28b is threaded around a pin 52 located within each ring 46 and 48 which, in a conventional manner, permits tightening of the strap 28 around the whales body while preventing slipping or loosening of the strap. Each of the pins 52 of rings 46 and 48 are formed with a loop 54 to which is attached one end of a cable 56. The opposite ends of the cables 56 may be located at some distance from the whale and at the appropriate time, pulled to remove the pins 52 from the rings 46 and 48 thereby releasing the strap ends 28a and 28b. Provided that strap 38 also includes a connector similar in type to connector 44, having a remote quick release cable 56, pulling all of the cables 56 from a remote location will result in disconnecting the ends of straps 28 and 38 thereby freeing the whale 10 of the harness 12.

It will readily be appreciated that many other types of connectors may be utilized. For example, any connector which permits adjustment of the length of the strap ends 28a and 28b and which has a remote quick disconnect capability could be utilized. In addition, and as best seen in FIG. 3, the strap ends 28a and 28b may be formed with measurement markers 28c which provide a circumference scale and permits the strap 28 to be evenly tightened.

Body straps 28 and 38 are also formed so as to carry rings 58 to permit the attachment of flotation devices 60 to the harness 12 by means of clips 62. The rings 58 are located on both the port and starboard sides of the whale, so as to permit use of a pair of flotation devices, one on each side of the whale. The flotation devices 60 are useful to help support the whale 12 and keep it afloat, but should only be used when required by the extremely poor health of the whale.

Figure 4:
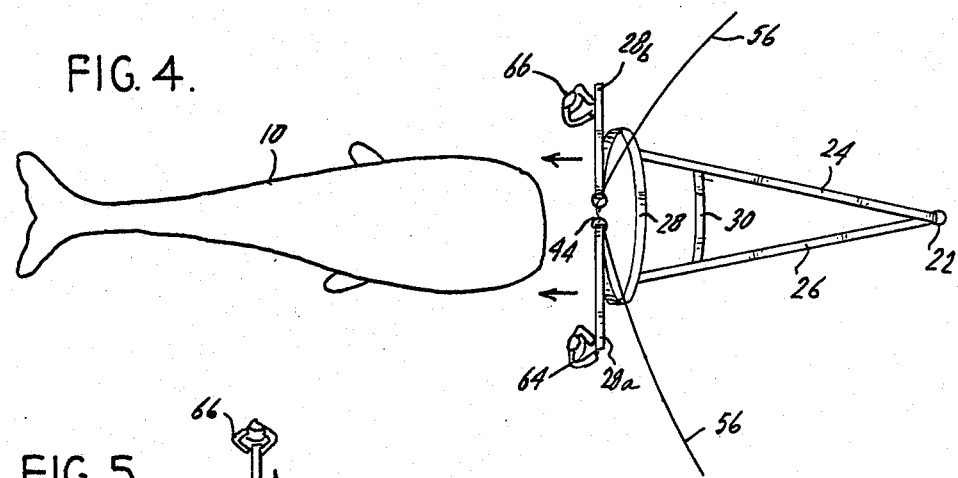
FIG. 4 is a top plan view of a whale, two divers and the whale harness of the present invention, with the harness shown and arranged in a position desired prior to placement of the harness o the whale.
Figure 5:
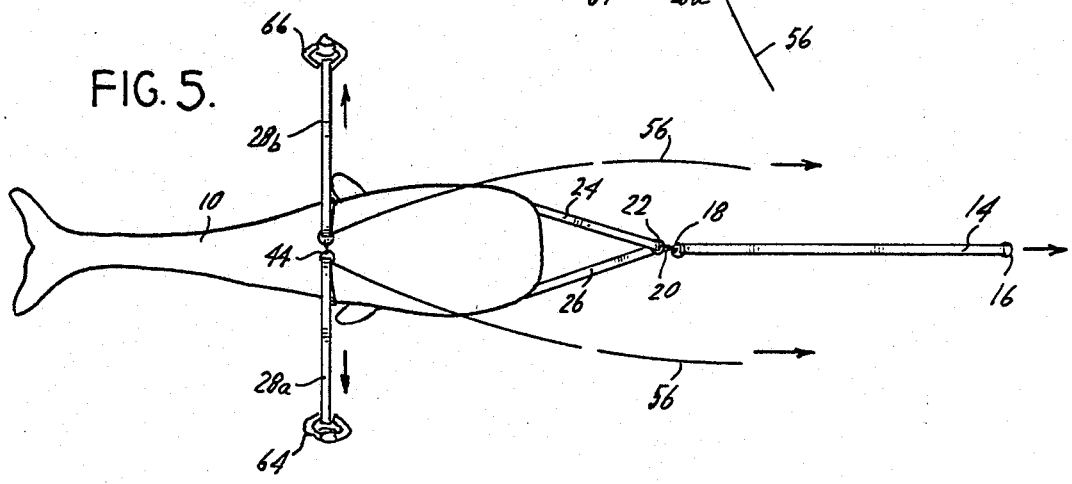
FIG. 5 is a top view of the divers and the whale of FIG. 4 after placement of the whale harness of the present invention on the whale.

Referring now to FIGS. 4 and 5, the portion of the whale harness 12 defined by the port and starboard straps 24 and 26, the chin strap 30 and the first body strap 28 is shown in FIG. 4 prior to its placement on a stranded whale 10. Specifically, the first body strap 28 (with the ends 28a and 28b connected) is loosened sufficiently to fit over the head and flippers of the whale and the port 24, starboard 26 and chin 30 straps are arranged forward of the whale's head. Divers 64 and 66 position the first body strap 28 at the whale's head and begin to move towards the whale's tail such that the strap 28 is located around the whale's body. When the strap 28 is just past the whale's flippers (FIG. 5) the divers 64 and 66, holding respective strap ends 28a and 28b, move away from the whale thereby tightening the strap 28 around the body of the whale 10. Applying the harness 12 in this manner assures that the port 24, starboard 26 and chin 30 straps are located in their proper positions relative to the whale's body and allows the quick attachment of the tow strap 14 to begin towing the whale either out to sea or to a location at which it can be properly treated.

In another method for placing the portion of the harness shown in FIGS. 3, 4 and 5 on the whale 10, the two ends 28a and 28b of first body strap 28 are disconnected and held by divers standing in front of the whale 10, on opposite sides thereof. The divers then approach the whale, moving strap 28 below the whale to a position behind the whale's flippers. At this point the divers connect the two ends 28a and 28b and pull the ends to tighten the harness around the whale. The tow strap 14 may then be attached to ring 22 and towing of the whale commenced.

Placement of the second body strap 38 on the whale 10 may be accomplished in a manner similiar to that described above for strap 28, however, strap 38 is preferably placed on the whale first. Alternatively, strap 38 may be placed on the whale from the tail end thereof. Specifically, the connector, not shown, securing the two ends of the strap 38 is operated to disconnect the two ends. The strap 38 is then placed around the narrow portion of the whale's body proximate to the tail. The two ends of the strap 38 are then reconnected and the strap moved towards the whale's flippers. When the strap 38 reaches its proper position it can then be tightened in the same manner as strap 28.

It will readily be appreciated that the portion of the harness shown in FIGS. 3, 4 and 5 may be used without the second body strap 38, if necessary. The use of the second body strap is normally desired, however, and is particularly useful when utilizing the harness 12 with the flotation devices 60.

Once the harness 12 is attached to the whale 10 and the tow strap 14 connected at one end to both the port strap 24 and starboard strap 26, and at the other end to a vessel capable of towing the whale 10, the whale 10 may be towed either out to sea or to an area where the whale can be nursed back to health before returning to deeper water. The forward towing position achieved by the harness 12 is more humane than the conventional tail tow as it is non-destructive, both physically and emotionally to the whale 10. Further, the natural angular forces of the harness keep the whales head up during towing thereby decreasing the risk of accidental drowning of the whale In addition, the harness will not chafe the whale to the extent that rope will and in situations where the whale is extremely ill, the flotation devices 60 may be utilized to help offset the two tons of negative buoyancy associated with the whale. Once the whale has been towed to the desired location, the harness may be quickly removed from the whale by use of the quick release cables 56, thereby setting the whale free.

As such, the harness of the present invention permits the safe, effective and humane rescue and return to the sea of whales and other mammals that are stranded on coastal shores and beaches.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalence of the claims are intended to be embraced.

What I claim is:

1. A method of returning a beached cetacean to water deep enough for the mammal to swim in comprising the steps of:

attaching a harness about the marine mammal at a position behind the mammal's flippers but in front of its tail;

tightening the harness about the marine mammal without inhibiting movement of the marine mammal's tail;

towing the mammal substantially forwardly into deep water; and supporting the marine mammal's chin during towing to keep its spout above water during towing; and releasing the marine mammal from the harness.

* * * * *